United States Patent
Takakura

(10) Patent No.: US 8,579,269 B2
(45) Date of Patent: Nov. 12, 2013

(54) ENGINE MOUNT STRUCTURE

(75) Inventor: Tomoki Takakura, Hita (JP)

(73) Assignee: Bridgestone Corporation, Tokyo (JP)

( * ) Notice: Subject to any disclaimer, the term of this patent is extended or adjusted under 35 U.S.C. 154(b) by 123 days.

(21) Appl. No.: 12/516,306

(22) PCT Filed: Nov. 27, 2007

(86) PCT No.: PCT/JP2007/072817
§ 371 (c)(1),
(2), (4) Date: May 26, 2009

(87) PCT Pub. No.: WO2008/066020
PCT Pub. Date: Jun. 5, 2008

(65) Prior Publication Data
US 2010/0059912 A1    Mar. 11, 2010

(30) Foreign Application Priority Data

Nov. 28, 2006   (JP) .................................. 2006-319767

(51) Int. Cl.
*F16F 5/00* (2006.01)
(52) U.S. Cl.
USPC .................................................. 267/140.13
(58) Field of Classification Search
USPC ..................... 267/136, 140.11–140.13, 293;
248/560–562, 612
See application file for complete search history.

(56) References Cited

U.S. PATENT DOCUMENTS

| | | | | |
|---|---|---|---|---|
| 5,964,456 A | * | 10/1999 | Someya | 267/140.13 |
| 6,409,158 B1 | | 6/2002 | Takashima et al. | |
| 7,341,244 B1 | * | 3/2008 | Adams | 267/140.13 |
| 2004/0183241 A1 | * | 9/2004 | Goto et al. | 267/140.13 |
| 2006/0082036 A1 | * | 4/2006 | Miyahara | 267/140.13 |

FOREIGN PATENT DOCUMENTS

| | | |
|---|---|---|
| EP | 1 080 970 A1 | 3/2001 |
| EP | 1321692 A2 | 6/2003 |
| EP | 1491790 A1 | 12/2004 |
| JP | 03-046035 U | 4/1991 |
| JP | 06-069471 U | 9/1994 |
| JP | 08-296680 A | 11/1996 |
| JP | 11-334388 A | 12/1999 |
| JP | 2001-105896 A | 4/2001 |
| JP | 2001-280404 A | 10/2001 |

OTHER PUBLICATIONS

International Search Report issued in corresponding European Application No. 07832542 dated Jul. 15, 2011.

* cited by examiner

*Primary Examiner* — Bradley King
*Assistant Examiner* — Vishal Sahni
(74) *Attorney, Agent, or Firm* — Sughrue Mion, PLLC

(57) ABSTRACT

An engine mount structure includes: an engine bracket 1 mounted to an engine; and an anti-vibration device 2 having an outer tube 7 fixed to a vehicle body, an inner tube 6 to which a front end portion of the engine bracket is inserted and fitted, and a rubber elastic body 8 interposed between the outer tube and the inner tube, wherein an engine bracket insertion hole 9 provided to the inner tube is offset from the center L of a mounting portion of the inner tube mounted to the rubber elastic body, toward the engine bracket. Accordingly, the bracket extending from the engine is allowed to have a natural frequency departing as much as possible from a natural frequency of the engine, and simultaneously, a reduction in weight can be achieved.

8 Claims, 3 Drawing Sheets

ENGINE MOUNT STRUCTURE

TECHNICAL FIELD

The present invention relates to an engine mount structure for supporting an engine.

Priority is claimed on Japanese Patent Application No. 2006-319767, filed on Nov. 28, 2006, the content of which is incorporated herein by reference.

BACKGROUND ART

As an engine mount structure for supporting an engine on a vehicle body while attenuating vibration to a certain extent, various types of structures have been used. As one of the types, Japanese Unexamined Patent Application, First Publication No. 2001-105896 proposes a structure for supporting an engine while an anti-vibration device made of a rubber material is interposed between a bracket on a vehicle body which is mounted to the vehicle body and an arm bracket extending from an engine to attenuate vibration as much as possible.

DISCLOSURE OF THE INVENTION

Problem to be Solved by the Invention

However, it has been believed that each component in the vicinity of the engine is preferably designed to have a natural frequency departing as much as possible from a natural frequency of the engine. This is also applied to components constituting an engine mount structure, such as, an engine bracket which is mounted to the engine to extend from the engine to the anti-vibration device and the bracket on the vehicle body for mounting the anti-vibration device to the vehicle body. Specifically, for example, it has been believed that the engine bracket is preferably designed to have a natural frequency as high as possible such that the natural frequency thereof departs as much as possible from the natural frequency of the engine, since, the natural frequency of the engine is relatively low.

In addition, there has been a strong demand for a reduction in weight of each component in the vicinity of the engine.

However, in the technique disclosed in Japanese Unexamined Patent Application, First Publication No. 2001-105896 described above, the structure supports the engine bracket extending from the engine above the anti-vibration device at a position coaxial with the anti-vibration device. Therefore, a method of allowing the components of the engine mount structure to have natural frequencies departing from the natural frequency of the engine, or a particular method of enabling a reduction in weight was not disclosed, therefore, the technique could not meet the above-described preferences and demand.

An object of the invention is to provide an engine mount structure capable of allowing a bracket extending from an engine to have a natural frequency departing as much as possible from a natural frequency of an engine and achieving a reduction in weight.

Means for Solving the Problem

The invention employs the following devices in order to solve the above-mentioned problems.

According to the invention, an engine mount structure includes: an engine bracket mounted to an engine; and an anti-vibration device having an outer tube fixed to a vehicle body, an inner tube to which a front end portion of the engine bracket is inserted and fitted, and a rubber elastic body interposed between the outer tube and the inner tube, wherein an engine bracket insertion hole provided to the inner tube is offset from the center of a mounting portion of the inner tube mounted to the rubber elastic body, toward the engine bracket.

According to the invention, the engine bracket insertion hole provided to the inner tube is offset from the center of the mounting portion of the inner tube mounted to the rubber elastic body, toward the engine bracket. Accordingly, a length of the engine bracket extending from the engine can be reduced in accordance with the offset. In addition, as the length of the engine bracket is reduced, a natural frequency of the engine bracket can be high.

In addition, in order to increase a natural frequency of a member, a reduction in weight of the member and an increase in stiffness of the member are effective. Therefore, by reducing the length of the engine bracket, the two factors can be satisfied simultaneously. In addition, as described above, as the engine bracket is shortened, the reduction in weight can be achieved.

Moreover, without fastening members such as bolts and nuts, the front end portion of the engine bracket is directly inserted and fitted to the engine bracket insertion hole of the inner tube to fix the engine bracket and the inner tube to each other. Therefore, assembling is easy as the fastening members are not used, and a reduction in the number of components and a reduction in weight can be achieved.

In the engine mount structure according to the invention, the engine bracket insertion hole may be offset along the center axis of the engine bracket insertion hole.

In this case, in terms of the engine bracket, while a main appearance of an existing engine bracket that has been used is maintained, only the length of an insertion portion of the front end portion of the engine bracket to be inserted to the engine bracket insertion hole may be reduced. Therefore, applications for the invention are easy.

In addition, in the engine mount structure according to the invention, cross-sections of the front end portion of the engine bracket and the engine bracket insertion hole may have noncircular shapes corresponding to each other.

In this case, a relative rotation between the anti-vibration device and the engine bracket around the axis of the engine bracket insertion hole is restricted. For example, in the case where an excessive force is exerted during transportation after assembling the engine bracket and the anti-vibration device, a relative rotation between the anti-vibration device and the engine bracket does not occur. Accordingly, in the subsequent processes, operations of assembling those engine mount assemblies with the engine or the vehicle body become easy.

In the engine mount structure according to the invention, at least one of the inner tube and the engine bracket may be cast in aluminum or an aluminum alloy.

In this case, although the inner tube and the engine bracket are typically made of press steel plates, at least one of is made of aluminum or the aluminum alloy, and accordingly the reduction in weight can be achieved. In addition, when the engine bracket is made of aluminum or the like, the natural frequency can be high due to the reduction in weight. In addition, casting products made of, for example, aluminum and the aluminum alloy have high design freedom than press steel plates and are more advantageous when processed to have noncircular shapes.

In the engine mount structure according to the invention, a cushioning member may be mounted between an inner peripheral surface of the engine bracket insertion hole of the inner tube and an outer peripheral surface of the front end portion of the engine bracket.

In this case, in a structure where the front end portion of the engine bracket is directly inserted and fitted to the engine bracket insertion hole of the inner tube without interposing the cushioning member therebetween, a high processing precision is required for the inner tube or the front end portion of the engine bracket, in order to satisfy a desired fitting condition. However, according to the invention, the cushioning member is interposed between the two, so that a desired fitting condition can be satisfied even though there is a slight dimension error. Specifically, even when the processing precision is low, the front end portion of the engine bracket can be easily inserted to the engine bracket insertion hole of the inner tube, and a deviation of the inserted engine bracket can be prevented.

In addition, in the case where the inner tube or the engine bracket is made of aluminum or the like, a situation where, when the engine bracket is inserted to the engine bracket insertion hole, an excessive load will be exerted on the members, and the aluminum material, which deforms easily, can be prevented in advance from being damaged.

In the engine mount structure according to the invention, the cushioning member may be made of a rubber material, and a surface thereof may be provided with an uneven portion.

The rubber material is deformed suitably when the engine bracket is inserted, so that effects of preventing damage to the inner tube and the engine bracket and the deviation of the inserted engine bracket can further be improved. In addition, the rubber material has been widely used as the cushioning member, and in this aspect, an engine mount structure with high reliability can be obtained.

Effect of the Invention

According to the invention, the length of the engine bracket extending from the engine can be reduced. In addition, as the length of the engine bracket is reduced, the natural frequency of the engine bracket can be high. As a result, resonance with the engine having a relatively low natural frequency can be prevented, and generation of vibrations and sounds can be suppressed. In addition, as the length of the engine bracket is reduced, a reduction in weight can be achieved. Moreover, without using the fastening members such as bolts and nuts, the front end portion of the engine bracket is inserted and fitted to the engine bracket insertion hole of the inner tube. Therefore, assembling is easy, and a reduction in the number of components and an additional reduction in weight can be achieved.

BRIEF DESCRIPTION OF THE REFERENCE NUMERALS

1: ENGINE BRACKET
2: ANTI-VIBRATION DEVICE
3: VEHICLE BODY BRACKET
6: INNER TUBE FITTING (INNER TUBE)
7: OUTER TUBE FITTING (OUTER TUBE)
8: RUBBER ELASTIC BODY
9: ENGINE BRACKET INSERTION HOLE
10: PROTRUDING PORTION
11: OUTER PERIPHERY RUBBER LAYER
12: INNER PERIPHERY RUBBER LAYER (CUSHIONING MEMBER)
14: LOWER BRACKET
15: UPPER BRACKET
16: SIDE BRACKET
17: BRACKET MAIN BODY
18: INSERTION PORTION OF ENGINE BRACKET (FRONT END PORTION OF ENGINE BRACKET)

BEST MODE FOR CARRYING OUT THE INVENTION

Hereinafter, an embodiment of an engine mount structure according to the invention will be described with reference to the accompanying drawings.

Figure 1:
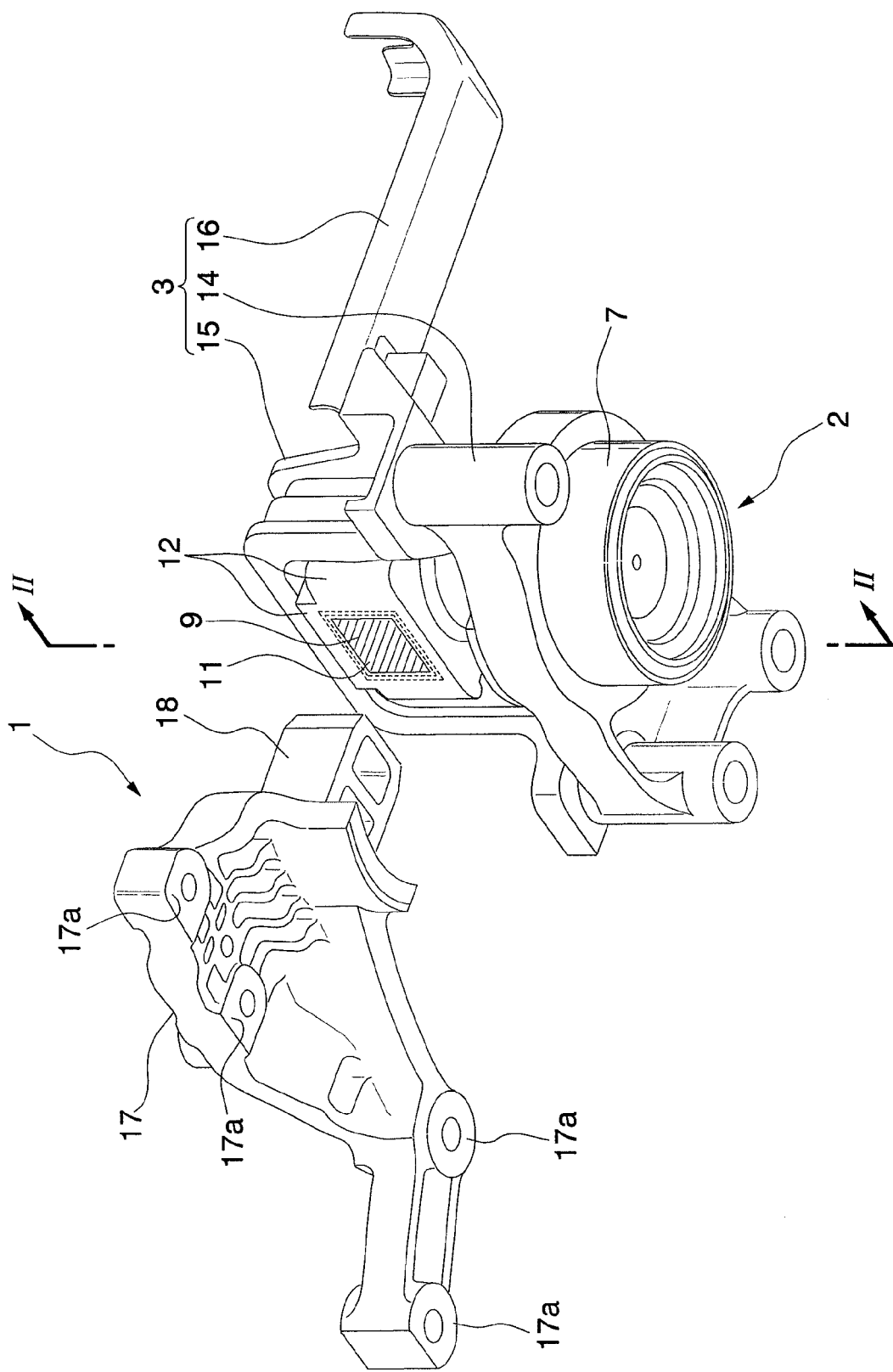
FIG. 1 is a partial exploded perspective view illustrating an engine mount structure according to an embodiment of the invention.
Figure 2:
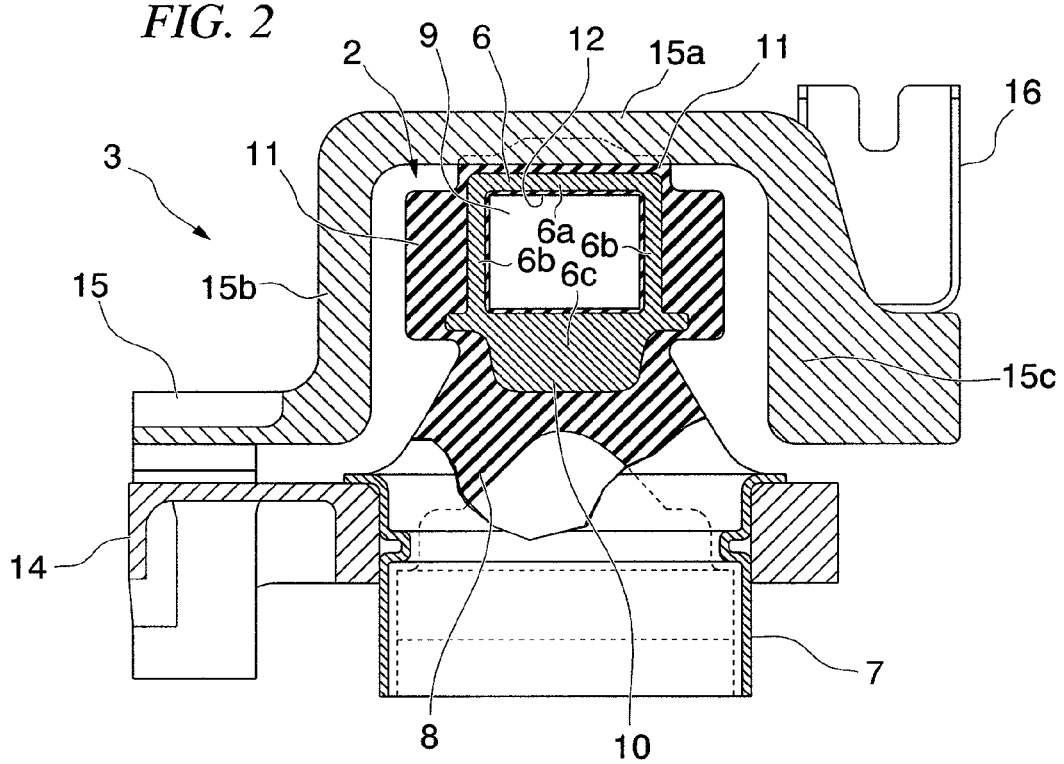
FIG. 2 is a cross-sectional view taken along the line II-II of FIG. 1.
Figure 3:
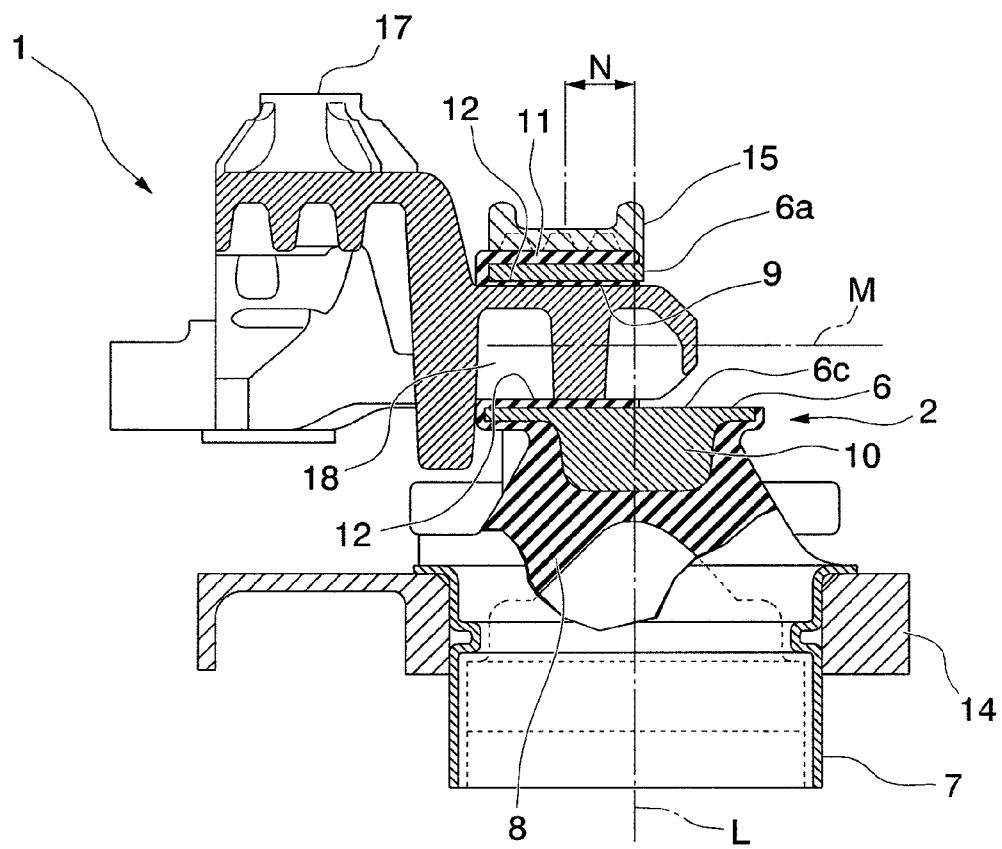
FIG. 3 is a cross-sectional view taken in a direction at 90° from the line in FIG. 2.

FIG. 1 is a partial exploded perspective view illustrating an engine mount structure. FIG. 2 is a cross-sectional view taken along the line II-II of FIG. 1. FIG. 3 is a cross-sectional view taken in a direction at 90° from the line in FIG. 2.

In FIG. 1, reference numeral 1 denotes an engine bracket mounted to an engine, reference numeral 2 denotes an anti-vibration device for supporting an engine while attenuating vibration transmitted through the engine bracket 1, and reference numeral 3 denotes a vehicle body bracket for mounting the anti-vibration device 2 to a vehicle body.

As illustrated in FIG. 2, the anti-vibration device 2 has a basic constitution including an inner tube fitting 6 at a head portion, an outer tube fitting 7 at a bottom portion, and a rubber elastic body 8 formed integrally with the inner tube fitting 6 and the outer tube fitting 7 by cure adhesion.

In addition, for the rubber elastic body 8, a configuration in which two liquid chambers being connected through an orifice is accommodated thereinside, and when vibration from the engine is input from the inner tube fitting 6 through the engine bracket 1, the vibration is transmitted to the outer tube fitting 7 at the bottom portion while liquid in the liquid chambers are vibrated in the orifice to generate liquid column resonance and attenuate the vibration to a certain extent, is used. Otherwise, for the rubber elastic body 8, a configuration simply using only a rubber material may be used as needed.

As illustrated in FIG. 2, an outer appearance of the inner tube fitting 6 has a substantially rectangular parallelepiped shape, an engine bracket insertion hole 9 which is rectangular is provided to penetrate a substantially center portion, and a protruding portion 10 which protrudes downward in FIG. 2 and has a substantially arc cross-section is formed at the center of a lower plate 6c. The inner tube fitting 6 is made of aluminum or an aluminum alloy.

As illustrated in FIG. 3, the engine bracket insertion hole 9 is offset from the center of a mounting portion of the inner tube fitting 6 mounted to the rubber elastic body 8, that is, from the center L of the protruding portion 10 toward the engine bracket 1. In addition, the engine bracket insertion hole 9 is offset toward the engine bracket 1 along the center axis M.

An upper plate 6a, a side plate 6b, and the lower plate 6c of the inner tube fitting 6 are flush with a front end of the engine bracket 1, and lengths of the upper plate 6a and the side plate 6b from there on the opposite side to the engine bracket 1 are shorter than that of the lower plate 6c. In addition, the lengths of the upper plate 6a and the side plate 6b have values greater than or equal to ½ of the length of the lower plate 6c.

Accordingly, an offset amount N of the bracket insertion hole 9 is less than or equal to ¼ of the length of the lower plate 6c.

Figure 4:
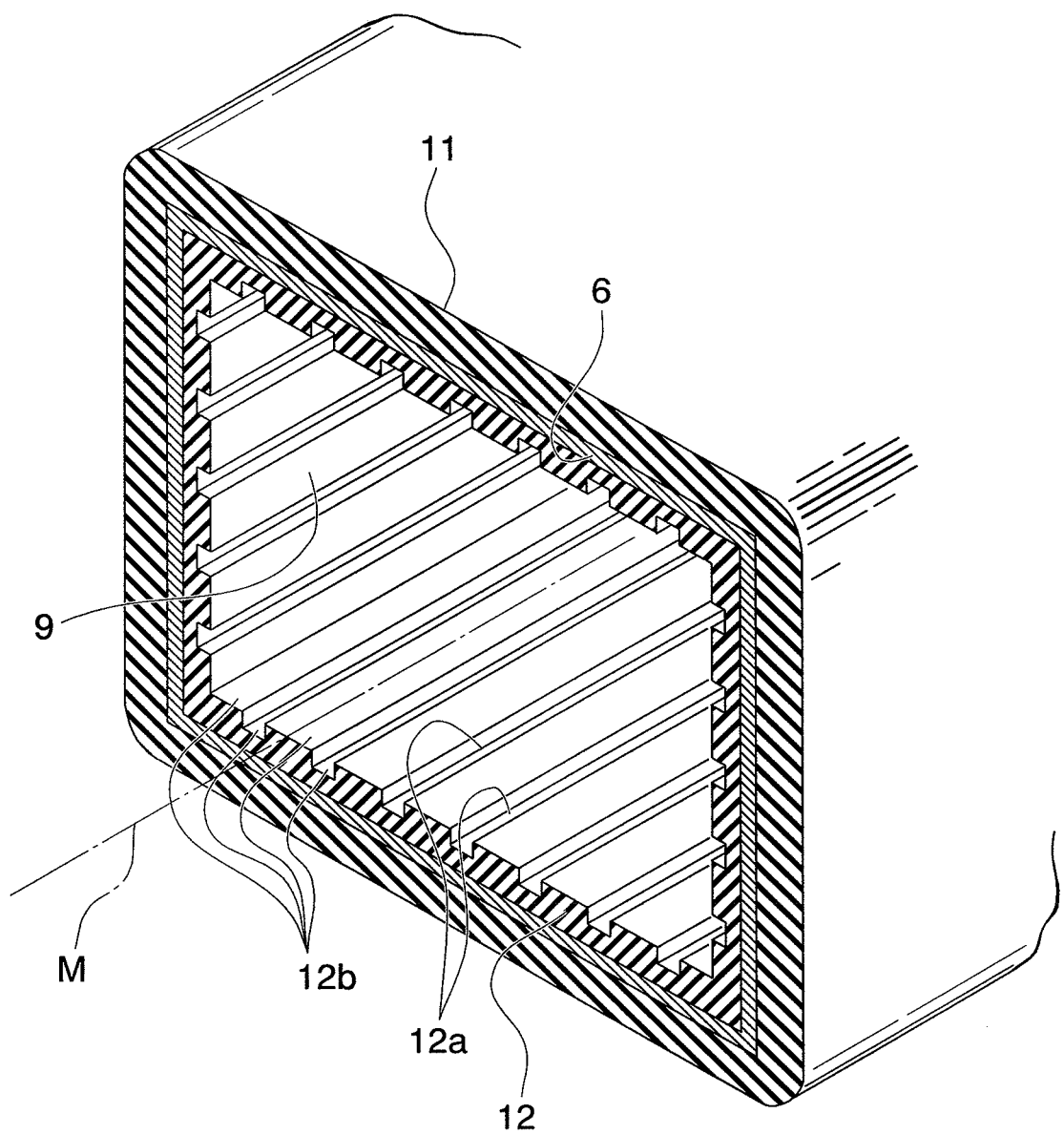
FIG. 4 is an expanded perspective view of an inner tube fitting and the vicinity thereof.

Portions of the rubber elastic body 8 which is to be interposed between the inner tube fitting 6 and the outer tube fitting 7 outflanks the outer and the inner peripheries of the inner tube fitting 6. On the outer and the inner peripheries of the inner tube fitting 6, outer and inner periphery rubber layers 11 and 12 are formed. FIG. 4 illustrates the outer and the inner periphery rubber layers 11 and 12. As illustrated in FIG. 4, on the inner periphery rubber layer 12 (cushioning member), plural grooves 12a extending along the center axis M of the engine bracket insertion hole 9 are formed at a predetermined interval. Accordingly, an uneven portion 12b is formed on an inner surface of the rubber layer 11. The thickness of the rubber layer 12 and the size of the uneven portion 12b are suitable values in consideration of an exposed thread during fitting of an insertion portion 18 of the engine bracket 1 to the engine bracket insertion hole 9 of the inner tube fitting 6.

As illustrated in FIG. 1, the vehicle body bracket 3 includes a lower bracket 14 fitted to an upper outer periphery of the outer tube fitting 7 to fix the outer tube fitting 7 to the vehicle body, an upper bracket 15 fixed to the lower bracket 14 with suitable fixing devices such as screwing to restrict a predetermined or higher degree of movement of the inner tube fitting 6, and a side bracket 16 fixed to the lower bracket 14 with suitable fixing devices such as screwing to restrict movement of the lower bracket 14 and movement of the insertion portion 18 of the engine bracket 1 in an insertion direction above the lower bracket 14.

As illustrated in FIG. 2, the upper bracket 15 has a substantially U-shape constituted by an upper plate portion 15a and left and right side plate portions 15b and 15c. In addition, the upper bracket 15 is fixed to the lower bracket 14 so that the upper plate portion 15a and the side plate portions 15b and 15c are disposed at suitable intervals from an upper surface and both left and right side surfaces of the inner tube fitting 6. Accordingly, when the inner tube fitting 6 is likely to move a predetermined or greater distance, the upper bracket 15 comes in contact with the inner tube fitting 6 through the outer periphery rubber layer 11 and restricts the movement of the inner tube fitting 6.

In addition, in FIGS. 2 and 3, a state of the anti-vibration device 2 before supporting the engine is illustrated. There is no gap between the upper surface portion 15a and the outer periphery rubber layer 11 on an upper side of the inner tube fitting 6.

However, when a load accompanied by a weight of the engine is exerted on the anti-vibration device 2, a gap between the upper surface portion 15a and the outer periphery rubber layer 11 on the upper side of the inner tube fitting 6 is formed.

The engine bracket 1 includes a bracket main body 17 having a plurality of bolt insertion holes 17a to be mounted to the engine, and the insertion portion 18 extending from the bracket main body 17 to be inserted to the engine bracket insertion hole 9 of the inner tube fitting 6 of the anti-vibration device 2.

An outer appearance of the insertion portion 18 has a rectangular shape similar to and slightly smaller than the engine bracket insertion hole 9 to correspond to the engine bracket insertion hole 9 of the inner tube fitting 6.

In addition, the vehicle body bracket 3 and the engine bracket 1 are made of (cast in) aluminum or an aluminum alloy for a reduction in weight.

Next, operations of the engine mount structure having the above-mentioned configuration will be described.

The engine is supported relative to the vehicle body by a plurality of supporting units having the above-mentioned engine mount structure in a state where vibration is attenuated.

In addition, for example, when vibration from the engine occurs, the vibration is transmitted to the inner tube fitting 6 of the anti-vibration device 2 through the inner periphery rubber layer 12 (cushioning member) from the insertion portion 18 of the engine bracket 1. In addition, in the anti-vibration device 2, as the liquid in the two liquid chambers provided in the anti-vibration device 2 vibrates in the orifice connecting the two liquid chambers, liquid column resonance occurs. Accordingly, in a state where the vibration of the inner tube fitting 6 is attenuated to a certain extent, the vibration is transmitted to the outer tube fitting 7 at a lower portion. As a result, the vibration of the engine can be reduced.

Here, in the engine mount structure having the above-mentioned structure, since the engine bracket insertion hole 9 provided in the inner tube fitting 6 is offset from the center of the mounting portion of the inner tube fitting 6 mounted to the rubber elastic body 8 toward the engine bracket 1, the length of the engine bracket 1 can be reduced in accordance with the offset. In addition, as the length of the engine bracket 1 is reduced, a natural frequency of the engine bracket 1 can be high. As a result, resonance with the engine having the relatively low natural frequency can be prevented, and generation of vibrations or sounds can be suppressed. In addition, as the length of the engine bracket is reduced, the reduction in weight can be achieved.

Moreover, without using fastening members such as bolts and nuts, the insertion portion 18 of the engine bracket 1 is inserted and fitted to the engine bracket insertion hole 9 of the inner tube fitting 6. Therefore, assembling is easy, and a reduction in the number of components and an additional reduction in weight can be achieved.

In addition, in the engine mount structure having the above-mentioned configuration, the cross-sections of the insertion portion 18 of the engine bracket 1 and the engine bracket insertion hole 9 have rectangular shapes corresponding to each other. Accordingly, a relative rotation between the engine bracket 1 and the anti-vibration device 2 around the center axis M of the engine bracket insertion hole 9 is restricted. Therefore, for example, in the case where excessive force is exerted during transportation after assembling the engine bracket 1 and the anti-vibration device 2 with each other, the relative rotation between the engine bracket 1 and the anti-vibration device 2 does not occur. Accordingly, in the subsequent processes, operations of assembling those engine mount assemblies with the engine or the vehicle body become easy.

In addition, in the engine mount structure having the above-mentioned configuration, since the inner tube fitting 6 and the engine bracket 1 are made of aluminum or the aluminum alloy, accordingly, a reduction in weight can be achieved. Particularly, since the engine bracket 1 is made of aluminum or the like, the natural frequency thereof can be increased in accordance with the weight reduction. Accordingly, resonance with the engine can further be prevented. In addition, casting products made of aluminum or aluminum alloys have higher design freedom than press steel plates and are more advantageous when processed to have noncircular shapes.

Furthermore, in the engine mount structure having the above-mentioned configuration, the inner periphery rubber layer 12 (cushioning member) is interposed between an inner peripheral surface of the engine bracket insertion hole 9 of the inner tube fitting 6 and an outer peripheral surface of the insertion portion 18 of the engine bracket 1. Therefore, even when a slight dimension error exists between the two members, a desired fitting condition can be satisfied. Specifically, even when processing precision is low, the insertion portion 18 of the engine bracket 1 can be easily inserted into the engine bracket insertion hole 9 of the inner tube fitting 6. In addition, a deviation of the inserted engine bracket 1 can be prevented.

In addition, the invention is not limited to the embodiments, and suitable design modifications can be made without departing from the spirit and scope of the invention.

For example, in the embodiment, the engine bracket insertion hole 9 of the inner tube fitting 6 is offset along its center axis M. However, the embodiment is not limited thereto, and the offset may be made in a direction crossing the center axis M.

In addition, in this embodiment, the engine bracket insertion hole 9 of the inner tube fitting 6 and the insertion portion 18 of the engine bracket 1 are configured to have rectangular cross-sections. However, the embodiment is not limited thereto, and for example, they may be configured to have elliptical cross-sections, circular cross-sections of which some portions are flat, or pentagonal cross-sections. The point is that the cross-sections are noncircular.

In addition, in this embodiment, both of the inner tube fitting 6 and the engine bracket 1 are made of aluminum or the like. However, the embodiment is not limited thereto, and only one of them may be made of aluminum or the aluminum alloy.

In addition, in this embodiment, the inner periphery rubber layer 12 (cushioning member) is interposed between the engine bracket insertion hole 9 of the inner tube fitting 6 and the insertion portion 18 of the engine bracket 1. However, the embodiment is not limited thereto, and other cushioning members may be interposed therebetween. In addition, the cushioning member does not need to be mounted to the inner tube fitting 6 and may be mounted to the engine bracket 1.

INDUSTRIAL APPLICABILITY

According to the embodiment of the invention, the length of the engine bracket extending from the engine can be reduced. In addition, as the length of the engine bracket is reduced, the natural frequency of the engine bracket can be high. As a result, resonance with the engine having the relatively low natural frequency can be prevented, and accordingly the generation of vibrations or sounds can be suppressed. In addition, due to the reduction in the length of the engine bracket, a reduction in weight can be achieved. Moreover, without using fastening members such as bolts and nuts, the front end portion of the engine bracket is inserted and fitted to the engine bracket insertion hole of the inner tube. Therefore, assembling is easy, and the reduction in the number of components and an additional reduction in weight can be achieved.

The invention claimed is:

1. An engine mount structure comprising:
    an engine bracket mounted to an engine; and
    an anti-vibration device having an outer tube fixed to a vehicle body, an inner tube provided with an engine bracket insertion hole into which a front end portion of the engine bracket is inserted and fitted, and a rubber elastic body interposed between the outer tube and the inner tube,
    wherein the inner tube includes at least an upper plate, a side plate and a lower plate,
    the engine bracket insertion hole is formed of a space interposed between an under surface of the upper plate and a top surface of the lower plate, the top surface extending parallel to the under surface,
    an edge of the lower plate opposite to the engine bracket is disposed further from the engine bracket than corresponding edges of the upper and side plates,
    the engine bracket insertion hole is offset from the center of a mounting portion of the inner tube mounted to the rubber elastic body, in a direction closer to the engine,
    a center position of the upper plate in a center axis direction of the engine bracket insertion hole is offset from a center position of the lower plate in the center axis direction, in the direction closer to the engine, and
    wherein the upper plate has a length which is shorter than and at least one-half of a length of the lower plate.
2. The engine mount structure according to claim 1, wherein the engine bracket insertion hole is offset from the center of the mounting portion along a center axis of the engine bracket.
3. The engine mount structure according to claim 1 or 2, wherein cross-sections of the front end portion of the engine bracket and the engine bracket insertion hole have noncircular shapes corresponding to each other.
4. The engine mount structure according to any one of claims 1 or 2, wherein at least one of the inner tube and the engine bracket is made of aluminum or an aluminum alloy.
5. The engine mount structure according to any one of claims 1 or 2, wherein a cushioning member is mounted between an inner peripheral surface of the engine bracket insertion hole of the inner tube and an outer peripheral surface of the front end portion of the engine bracket.
6. The engine mount structure according to claim 5, wherein the cushioning member is made of a rubber material, and a surface thereof is provided with an uneven portion.
7. The engine mount structure according to claim 1, wherein
    the lower plate of the inner tube is mounted to the rubber elastic body, and the mounting portion is provided on the lower plate.
8. The engine mount structure according to claim 7, wherein
    the top surface and the under surface are disposed so that a central line of the mounting portion approximately perpendicular to the top surface penetrates each of the top surface and the under surface.

* * * * *